June 24, 1947.  L. B. STROTH  2,422,863
WINDSHIELD VISOR
Filed April 2, 1945
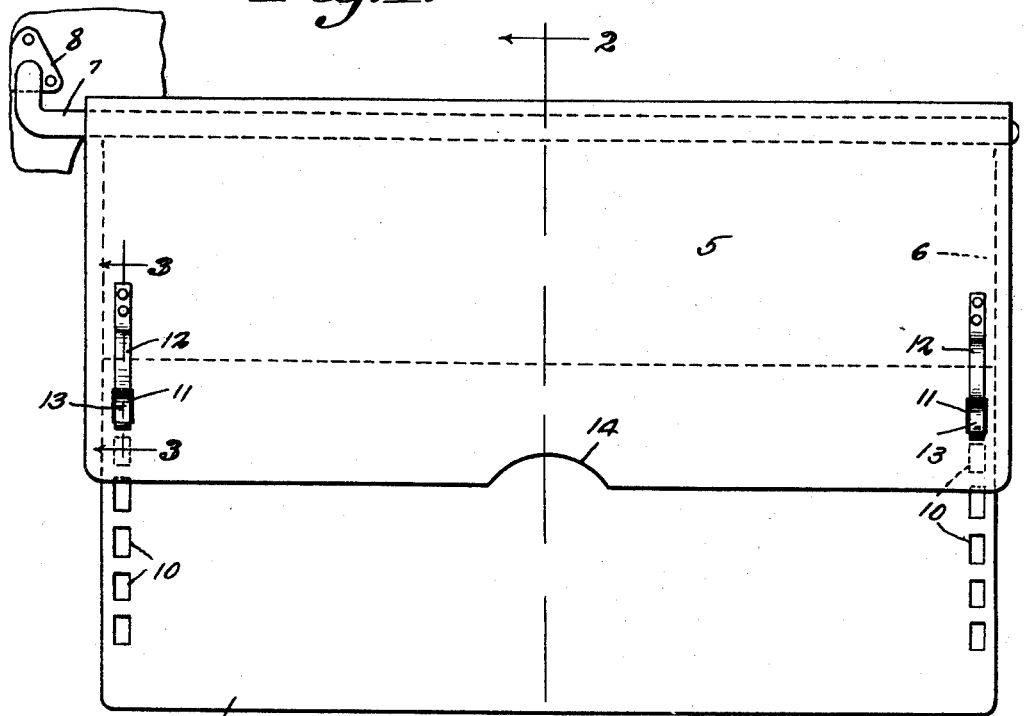
L. B. Stroth INVENTOR.
BY C. A. Snow & Co.
ATTORNEYS.

Patented June 24, 1947

2,422,863

UNITED STATES PATENT OFFICE 2,422,863

WINDSHIELD VISOR

Lowry B. Stroth, Wellston, Ohio

Application April 2, 1945, Serial No. 586,115

2 Claims. (Cl. 296—97)

This invention relates to motor vehicle windshield visors, the primary object of the invention being to provide a visor having an adjustable section constructed of translucent material, which may be readily extended beyond one longitudinal edge of the main section of the visor, thereby providing a shield for the eyes of the operator of the motor vehicle, against sun rays or light rays from approaching motor vehicle headlights.

An important object of the invention is to provide a windshield visor having a compartment for the adjustable section, so that the adjustable section may be moved to a position concealed within the main section of the visor.

Still another object of the invention is to provide means for automatically securing the extension section in various positions of adjustment with respect to the main section, as the adjustable section is moved from the compartment, the holding means being automatic in its operation.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

Referring to the drawing,

Figure 1 is an elevational view of a motor vehicle windshield visor constructed in accordance with the invention.

Figure 2 is a sectional view taken on line 2—2 of Figure 1.

Figure 3 is a sectional view taken on line 3—3 of Figure 1.

Referring to the drawing in detail, the reference character 5 indicates the visor of a construction to provide a compartment 6 extending throughout the length and width thereof.

The visor proper is provided with an opening formed adjacent to one of its longitudinal edges, which opening accommodates the rod 7 of the bracket 8 which is secured to the windshield frame, in the usual and well-known manner. It might be stated that bracket is of the type which may be operated to swing the visor to various positions with respect to the windshield.

One edge of the compartment 6 is open, to permit the extension section 9 to be inserted in the compartment, the extension section 9 being constructed of sheet material of a translucent nature.

Along the side edges of the extension section 9, are lines of openings 10 that extend therethrough, which openings are adapted to register with the openings 11 formed in the visor 5. Spring arms indicated by the reference character 12 are riveted to the visor proper, and have curved end portions 13 adapted to extend through the registered openings 10 and 11, in a manner as shown by Figure 3. Thus it will be seen that when the extension section 9 of the visor is extended beyond the free edge of the main section of the visor, the spring arms extending through the registered openings, will secure the extension section of the visor in its position of adjustment. The curvatures of the spring arms are such that by exerting pressure on the extension section 9 to either return the section 9 to the compartment or withdraw it from the compartment, the spring will be moved outwardly to the dotted line position as shown by Figure 3 of the drawing, permitting free movement of the extension.

Due to this construction, it will be seen that the operator of the vehicle may withdraw the extension section 9 to any desired position to expose a predetermined width of the extension section, to the end that the visor may be adapted for various conditions.

In order that the extension section 9 may be easily gripped, the main section of the visor is formed with a curved cut away portion 14 which exposes a portion of the extension section, when the extension section is housed within the compartment. The spring arms 12 will also act to hold the extension section 9 in its inactive position within the compartment, when not in use.

What is claimed is:

1. A wind shield visor comprising a main visor section adapted to be supported adjacent to a wind shield, said main visor section having a compartment open along one of its edges, an extension section constructed of translucent material adapted to move into the compartment, said main visor section having openings formed adjacent to the side edges thereof communicating with the compartment, said extension section having lines of openings formed along the side edges, said openings adapted to register with the openings of the main visor section, and spring arms secured to the main visor section and adapted to extend through registering openings of the main visor section and extension section, securing the extension section against movement within the compartment.

2. A wind shield visor comprising a main visor section slotted along the free edge thereof providing a compartment, an extension section constructed of translucent material slidably mounted within the compartment, said main visor section and extension having registering openings, spring arms secured to the main visor section, said spring arms having curved end portions adapted to extend through the registering openings of the main visor section and extension, normally locking the extension against movement within the compartment.

LOWRY B. STROTH.

REFERENCES CITED

The following references are of record in the file of this patent:

UNITED STATES PATENTS

| Number | Name | Date |
|---|---|---|
| 2,107,247 | Johnson | Feb. 1, 1938 |
| 2,239,240 | Magness | Apr. 22, 1941 |
| 1,383,668 | Smith | July 5, 1921 |
| 2,358,173 | McFadyen | Sept. 12, 1944 |
| 1,518,956 | Beitman | Dec. 9, 1924 |